(12) United States Patent
Heitzmann et al.

(10) Patent No.: US 12,286,131 B2
(45) Date of Patent: Apr. 29, 2025

(54) CONNECTIVITY BASED FUSION SPEED LIMIT ASSIST

(71) Applicant: Valeo Schalter und Sensoren GmbH, Bietigheim-Bissingen (DE)

(72) Inventors: Thomas Heitzmann, San Mateo, CA (US); Alexandre Garnault, Bietigheim-Bissingen (DE); Skander Hannachi, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 41 days.

(21) Appl. No.: 18/322,937

(22) Filed: May 24, 2023

(65) Prior Publication Data
US 2024/0391481 A1   Nov. 28, 2024

(51) Int. Cl.
*B60W 50/14*   (2020.01)
*B60W 30/14*   (2006.01)
*G06V 20/58*   (2022.01)

(52) U.S. Cl.
CPC .......... *B60W 50/14* (2013.01); *B60W 30/143* (2013.01); *G06V 20/582* (2022.01); *B60W 2050/146* (2013.01); *B60W 2556/35* (2020.02)

(58) Field of Classification Search
CPC ............... B60W 50/14; B60W 30/143; B60W 2050/146; B60W 2556/35; G06V 20/582
See application file for complete search history.

(56) References Cited

U.S. PATENT DOCUMENTS

| 2009/0187307 | A1* | 7/2009 | Imaeda | B60Q 1/525 701/36 |
| 2010/0188288 | A1 | 6/2010 | Bahlmann et al. | |
| 2011/0032093 | A1* | 2/2011 | Miller | G08G 1/0962 340/441 |
| 2017/0116485 | A1* | 4/2017 | Mullen | G08G 1/09626 |
| 2020/0019798 | A1* | 1/2020 | Stenneth | G06V 10/764 |

(Continued)

FOREIGN PATENT DOCUMENTS

| EP | 3021302 A1 | 5/2016 |
| FR | 3055287 A1 | 3/2018 |
| JP | 6288204 B1 * | 3/2018 |

OTHER PUBLICATIONS

International Search Report issued in corresponding International Application No. PCT/US2024/028470 mailed Sep. 19, 2024 (4 pages).

(Continued)

*Primary Examiner* — An T Nguyen
(74) *Attorney, Agent, or Firm* — Osha Bergman Watanabe & Burton LLP

(57) ABSTRACT

A method for operating a driver assistance system for a vehicle includes capturing a video feed of an external environment of the vehicle, receiving coordinates and a navigational speed limit from a signal connection identifying a location of the vehicle, transmitting the video feed and the coordinates to an Electronic Control Unit of the vehicle, and extracting a detected speed limit from the video feed of the external environment of the vehicle. The method further includes comparing the detected speed limit to the navigational speed limit to create a fusion speed limit and notifying a user of the vehicle of the fusion speed limit.

16 Claims, 10 Drawing Sheets

(56) References Cited

U.S. PATENT DOCUMENTS

| | | | |
|---|---|---|---|
| 2020/0353894 A1* | 11/2020 | Obaidi | G05D 1/021 |
| 2020/0353922 A1 | 11/2020 | Lee | |
| 2020/0372012 A1* | 11/2020 | Averbuch | G06F 16/2379 |
| 2021/0287538 A1* | 9/2021 | Zhang | G06V 20/582 |
| 2022/0172616 A1* | 6/2022 | Xu | G01C 21/3691 |
| 2023/0125433 A1* | 4/2023 | Stenneth | G01C 21/3407 |
| | | | 701/25 |
| 2023/0186759 A1* | 6/2023 | Vigneau | G06F 16/90335 |
| | | | 701/93 |
| 2023/0275877 A1* | 8/2023 | Harel | G01C 21/3822 |
| | | | 713/189 |
| 2024/0215473 A1* | 7/2024 | Okura | G05D 1/248 |

OTHER PUBLICATIONS

Written Opinion issued in corresponding International Application No. PCT/US2024/028470 mailed Sep. 19, 2024 (6 pages).

\* cited by examiner

| Last Known Context | Implicit Speed Limits (MPH) | Maximum Implicit Speed Limit (MPH) | Navigational Confidence Value | Detected Speed Limit (MPH) | Visual Confidence Value | Fused Speed Limit (MPH) |
|---|---|---|---|---|---|---|
| City | 20-45 | 45 | 0.8 | 25 | 0.3 | 45 |

FIGURE 4

| Last Received Context | Implicit Speed Limits (MPH) | Maximum Implicit Speed Limit (MPH) | Navigational Confidence Value | Distance (miles) | Navigational Weight | Navigational Weighted Confidence Value | Detected Speed Limit (MPH) | Visual Confidence Value | Fused Speed Limit (MPH) |
|---|---|---|---|---|---|---|---|---|---|
| Country Side | 40-65 | 65 | 0.5 | 3 | 0.5 | 0.25 | 25 | 0.5 | ! |

CONNECTIVITY BASED FUSION SPEED LIMIT ASSIST

BACKGROUND

Recent advances in the field of automotive vehicles enable vehicles to detect and classify moving and stationary objects while driving, through the use of an object detection system. Advances in object detection as a whole have also enabled extracting information from the classified objects. By combining these technologies, modern vehicles are capable of detecting a speed limit sign located in a local environment of the vehicle and extracting the speed limit of the environment that the vehicle must obey. Modern vehicles are also often equipped with multiple sensors in addition to cameras, such as Global Positioning System (GPS) sensors that transmit location data and speed limits associated therewith to a user of the vehicle.

As a result of these capabilities, it is becoming increasingly common for governmental entities to implement laws and restrictions controlling the behavior of the vehicle in relation to the object detection protocols. Such laws and restrictions may include restrictions on the success rate of the object detection itself, such as a minimum confidence that the system must have for a particular object classification, or a minimum number of successfully identified objects. Due to the fact that vehicles must share a road, highway, or other driving surface with other drivers, and the fact that the vehicles are regulated by government entities, it is imperative that a vehicle is able to correctly display a safe speed limit for the surrounding environment.

Further, it is imperative to ensure that the vehicle is capable of validating any received or detected speed limit in case the vehicle receives false or misleading information related to the speed limit. However, while a vehicle is located within a "white zone," or a region of a driving surface where the vehicle cannot communicate with a signal connection supplying navigational data, the vehicle may not be capable of validating speed limits.

SUMMARY

One or more embodiments of the present invention relate to a method for operating a driver assistance system for a vehicle that includes capturing a video feed of an external environment of the vehicle, receiving coordinates and a navigational speed limit from a signal connection identifying a location of the vehicle, transmitting the video feed and the coordinates to an Electronic Control Unit (ECU) of the vehicle, and extracting a detected speed limit from the video feed of the external environment of the vehicle. The method further includes comparing the detected speed limit to the navigational speed limit to create a fusion speed limit and notifying a user of the vehicle of the fusion speed limit.

One or more embodiments of the present invention relate to a driver assistance system for a vehicle that includes a visual sensor that captures a video feed of an external environment of the vehicle, a navigational sensor that receives coordinates and a navigational speed limit from a signal connection identifying a location of the vehicle, and a dashboard that notifies a user of the vehicle of one or more vehicle operating conditions. The driver assistance system further includes an ECU that receives the video feed from the visual sensor, receives the coordinates and navigational speed limit from the navigational sensor, and extracts a detected speed limit from the video feed of the external environment of the vehicle. In addition, the ECU compares the detected speed limit to the navigational speed limit to create a fusion speed limit and outputs the fusion speed limit to the dashboard to notify the user of the fusion speed limit.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

FIG. 4 shows a visualization of a process in accordance with one or more embodiments disclosed herein.

FIG. 6 shows a visualization of a process in accordance with one or more embodiments disclosed herein.

DETAILED DESCRIPTION

Figure 1:
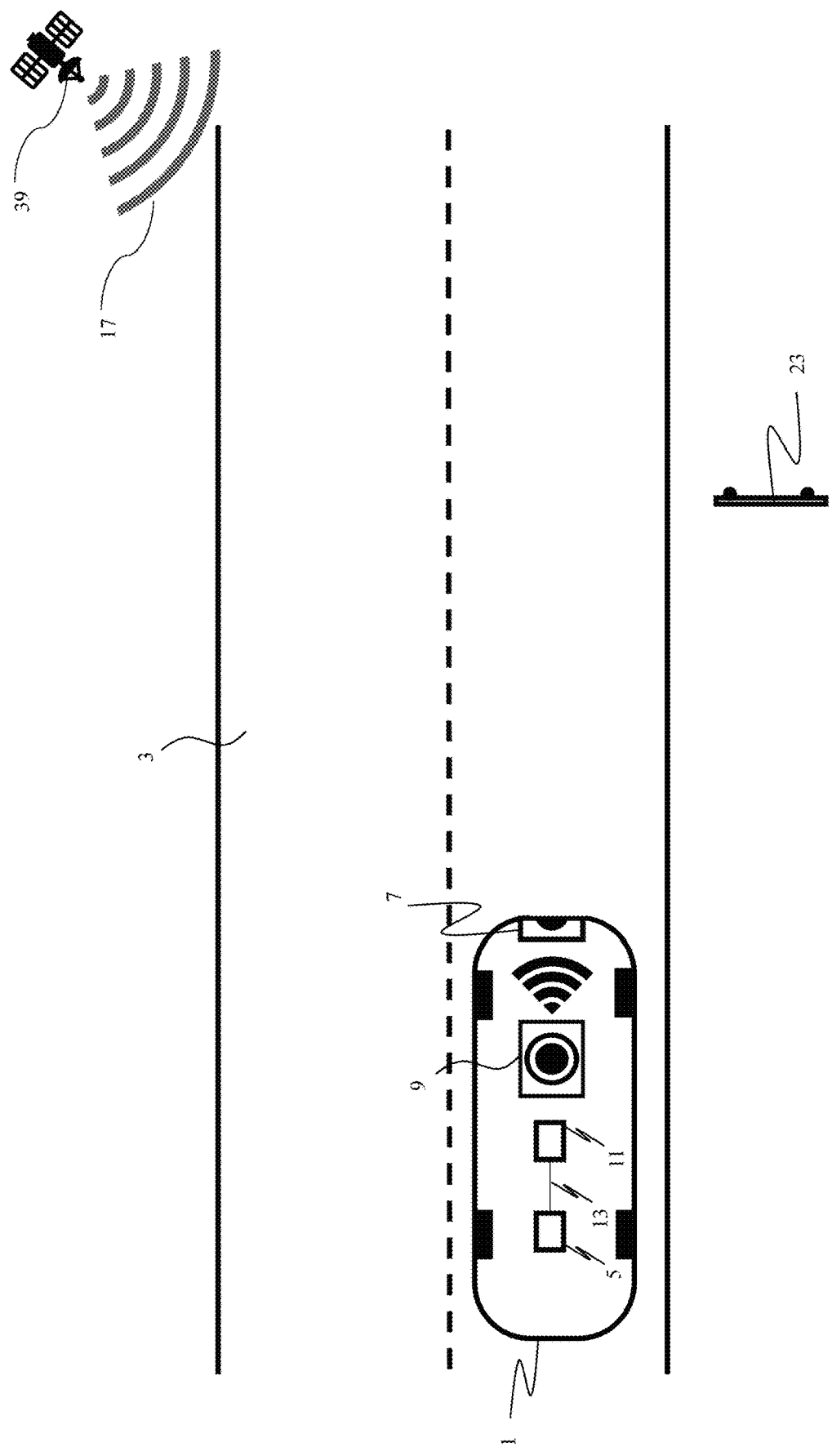
FIG. 1 shows a system in accordance with one or more embodiments disclosed herein.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed towards driver assistance systems and methods of operating driver assistance systems. The driver assistance systems are capable of receiving a video feed and location data of the local environment of a vehicle that includes the driver assistance system, and determining a context associated with the local environment.

A context associated with the specific (or local) environment is defined to include, but is not limited to, a classification of the environment into a predefined category. For example, an urban environment that the vehicle traverses may be classified as being a "city" context, while a rural environment may be classified as a "country side." Other examples of environment contexts include a "parking lot", a "highway", a "school zone", a "construction zone", or other equivalent descriptions of the environment. The context of the specific environment is extracted from navigational data, such as data from a cloud based map or global coordinates of the vehicle, sent to a sensor of the vehicle by a signal connection.

Further, the driver assistance systems are capable of receiving a video feed and location data of the local environment of a vehicle that includes the driver assistance system, and determining a fusion speed limit. The fusion speed limit is notified to a user of the system, which allows the user to control the vehicle with knowledge of the fusion speed limit rather than solely the detected speed limit. Thus, the process of determining a fusion speed limit requires heterogeneous sensors in order to represent the environment as accurately and completely as possible.

In addition, the driver assistance systems are capable of determining a fusion speed limit when the vehicle is unable to receive updated location data of the local environment of the vehicle (i.e., when navigation is lost). That is, based upon the context identified and associated with the vehicle and a detected speed limit that is detected or received by the driver assistance system (i.e., a speed limit extracted from a speed limit sign), the driver assistance system may determine a fusion speed limit of the region.

FIG. 1 depicts an example of a vehicle 1 in accordance with one or more embodiments disclosed herein. As shown in FIG. 1, a vehicle 1 traveling on a roadway 3 includes an Electronic Control Unit (ECU) 5, a visual sensor 7, a navigational sensor 9, and a dashboard 11. Components of the vehicle 1 are interconnected through the use of a bus 13, which is at least one wire, wiring harness, and/or connector that serve to transmit data throughout the vehicle 1. Collectively, the ECU 5, the visual sensor 7, the navigational sensor 9, and the bus 13 are part of an Advanced Driver Assistance System (ADAS) 15, which is further discussed in relation to FIG. 6.

The visual sensor 7 collects quantitative data associated with the environment of the vehicle 1. Examples of the visual sensor 7 include a two dimensional camera, a three dimensional or stereoscopic camera, a radar unit, a LiDAR unit, an ultrasonic frequency transducer, or an equivalent sensor or component that perceives the environment of the vehicle 1. Furthermore, the visual sensor 7 may include multiple sensors in a single package.

In addition to the visual sensor 7, the vehicle 1 includes a navigational sensor 9 that receives a signal connection 17 that includes global coordinates of the vehicle 1. The navigational sensor 9 may be a Global Positioning System (GPS) sensor, for example, or an equivalent sensor that determines the location of the vehicle 1 in relation to its environment. The signal connection 17 may also include information such as direction and speed of the vehicle 1. In this case, the direction and speed may be derived by comparing the global coordinates to their previous counterparts to determine the length of time that the vehicle 1 was traveling between two points. The signal connection 17 may further include information associated with the coordinates themselves, such as, for example, which country the coordinates are located in, or a designated speed limit of a roadway 3 that the coordinates are located at.

The ECU 5 may be formed of one or more processors, microprocessors, or equivalent computing structures, and serves to generate and transmit instructions to a user of the vehicle 1 and to the other components of the vehicle 1 such as the dashboard 11. The instructions are generated based on data received from the visual sensor 7 and the navigational sensor 9. Specifically, the ECU 5 receives a visual feed of the external environment of the vehicle 1 from the visual sensor 7 and GPS coordinates and/or a navigational speed limit 19 from the navigational sensor 9. In this way, the ECU 5 extracts a detected speed limit 21 from the video feed of the external environment of the vehicle 1. Further, if only GPS coordinates are provided to the ECU 5 from the navigational sensor 9, the navigational speed limit 19 may be determined by the ECU 5 by utilizing a database or lookup table using the GPS coordinates. Specifically, the navigational speed limit 19 is a designated speed limit that is associated with specific GPS coordinates.

The instructions from the ECU 5 are presented to a user of the vehicle 1 via the dashboard 11, which is a display such as a Liquid Crystal Display (LCD), an Organic Light-Emitting Diode (OLED) display, a quantum dot display, or equivalent display that is configured to present the user with information received from the ECU 5.

In FIG. 1, and for illustrative purposes only, the vehicle 1 is disposed on a roadway 3 that is located in a "country side" context. Here, the local environment of the vehicle 1 includes a speed limit sign 23 and a roadway 3, where the roadway 3 includes two lanes for automotives traveling in opposite directions. While the vehicle 1 is traveling on the roadway 3, the visual sensor 7 captures raw data, such as a video feed, that includes each speed limit sign 23 passed by the vehicle 1. In addition, the visual sensor 7 may capture crosswalks, traffic lights, construction signs, stop lines, additional vehicles 1, and any other markers of the environment of the vehicle 1.

After capturing the data of the external environment of the vehicle 1, the data is processed to extract the detected speed limit 21 therefrom. Examples of processing the data include inputting the data into object detection algorithms such as a Single Shot Detection (SSD), Region-based Convolutional Neural Network (R-CNN), You Only Look Once (YOLO) Single Shot Detection, Fast R-CNN, Histogram of Oriented Gradients (HOG), or equivalent algorithms. The object detection process may be performed by the ECU 5, a dedicated component such as a graphics card, or by the visual sensor 7 itself. As an output of the algorithm, the ECU 5 receives the identity of the object, the location of the object, and any text associated with the object. For example, in the case of the vehicle 1 processing data of the roadway 3 including a speed limit sign 23, the vehicle 1 receives information that a sign that represents the speed limit for the roadway 3 is located in the visual vicinity of the vehicle 1.

The context of the specific environment of the vehicle 1 may be determined by the ECU 5 based on context information provided by the navigational sensor 9 or by the navigational sensor 9 itself. That is, the ECU 5 and/or the navigational sensor 9 may analyze cloud based map data or GPS coordinates of the vehicle 1 provided by the signal connection 17 to determine the context of the specific environment of the vehicle 1. As this mainly depends on the type of roadway 3 and the driving context, it is necessary to accurately locate the vehicle 1 and match its position with the most likely roadway 3. In addition, the ECU 5 may analyze a navigational speed limit 19 provided by the signal connection 17 to conclude the context region of the vehicle 1.

Figure 2:
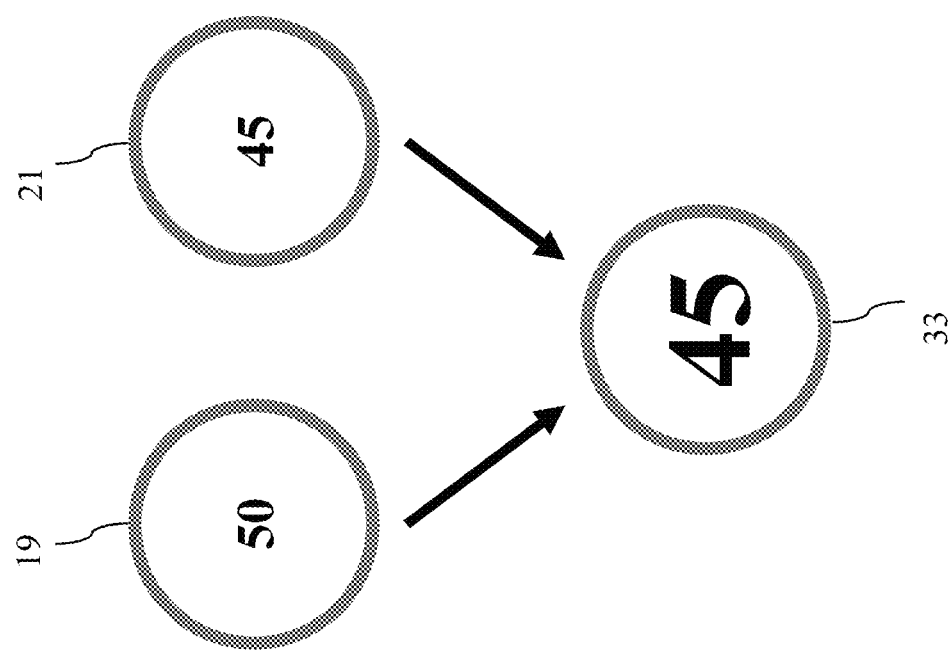
FIG. 2 shows a visualization of a process in accordance with one or more embodiments disclosed herein.

FIG. 2 depicts a visualization of a process of generating a fusion speed limit 33. Specifically, the ECU 5 compares the detected speed limit 21 to the navigational speed limit 19 to generate a fusion speed limit 33, which is the speed limit displayed to the user on a dashboard 11.

While analyzing the visual data to determine the detected speed limit 21, the ECU 5 also determines a visual confidence value 29 (e.g., FIG. 4). The visual confidence value 29 represents a confidence level of the ECU 5 that the visual feed of the environment of the vehicle 1 extracted from the visual sensor 7 of the vehicle 1 is accurate. Despite the use of accurate visual sensors 7, some issues inherent to the use of visual sensors 7 cannot be ignored. In particular, performances of visual sensors 7 may be strongly affected by weather conditions, such as rain or fog. In addition, visual sensors 7 may fail in accurately capturing the value appearing on the speed limit sign 23, or even the speed limit sign 23 itself, because of deterioration or partial occlusion. The vehicle 1 may follow restrictions on the success rate of the object detection itself, such as a minimum confidence that the ECU 5 must have for the detected speed limit 21. These restrictions may be defined by the user of the vehicle 1, the vehicle manufacturer, or a government entity.

As such, each visual confidence value 29 is a value ranging from "0-1" (inclusive), where a value of "0" means that the ECU 5 is uncertain of the value of the detected speed limit 21, and a value of "1" indicates that the ECU 5 is highly confident in the value of the detected speed limit 21. Visual confidence values 29 may be assigned/generated by the ECU 5 as part of a machine learning process, or alternatively downloaded from an external database (not shown) such as a server.

Further, upon receiving or determining a navigational speed limit 19 from the navigational sensor 9, the ECU 5 determines a navigational confidence value 30 (e.g., FIG. 4) that represents a confidence level of the ECU 5 that the navigational speed limit 19 extracted from the navigational sensor 9 of the vehicle 1 is accurate. The navigational confidence value 30 has a value ranging from "0-1" (inclusive), where a value of "0" means that the ECU 5 is uncertain of the navigational speed limit 19, and a value of "1" indicates that the ECU 5 is highly confident in the navigational speed limit 19. Similar to visual confidence values 29, navigational confidence values 30 may be assigned/generated by the ECU 5 as part of a machine learning process, or alternatively downloaded from an external database (not shown) such as a server.

The values of navigational confidence values 30 may be strongly affected by limitations associated with the navigational data and/or the signal connection 17. For example, the navigational confidence value 30 of a navigational speed limit 19 may vary depending on the date the navigational data was last updated. In another example, the navigational confidence value 30 of a navigational speed limit 19 may vary if the visual sensor 7 detects that the vehicle 1 is traveling through a construction zone.

In the fusion speed limit 33 generation process, the ECU 5 compares the visual confidence value 29 associated with the detected speed limit 21 to the navigational confidence value 30 associated with the navigational speed limit 19. In a case where the value of the visual confidence value 29 is greater than the value of the navigational confidence value 30, the ECU 5 displays the detected speed limit 21 as the fusion speed limit 33. However, if the value of the navigational confidence value 30 is greater than the value of the visual confidence value 29, the ECU 5 displays the navigational speed limit 19 as the fusion speed limit 33. The fusion speed limit 33 generation process is repeated for each update to the navigational speed limit 19 and the detected speed limit 21 provided by the navigational sensor 9 and visual sensor 7, respectively.

The user of the vehicle 1 may preset the course of action of the ECU 5 in the fusion speed limit 33 generation process for the case that the values of both the visual confidence value 29 and the navigational confidence value 30 are equal to one another. For example, the user may preset that either the detected speed limit 21 or the navigational speed limit 19 to be displayed as the fusion speed limit 33 in such case.

In addition, the ECU 5 may enter a degraded mode 35 and display an error message or icon indicating that the ECU 5 is unsure of the fusion speed limit 33 if both of the visual confidence value 29 and the navigational confidence value 30 are below a predetermined value. Also, the ECU 5 may alternatively enter the degraded mode 35 if the detected speed limit 21 is greater than or less than the navigational speed limit 19 by a predetermined amount. This predetermined amount may vary for each specific environment the vehicle 1 is located within.

The navigational data provided by the signal connection 17 may frequently include some limitations that influence a mismatch of the detected speed limit 21 and the navigational speed limits 19. For example, the navigational data may include an inaccurate location of the vehicle 1 due to a lack of visibility of satellites 39. Further, there may be an inaccurate matching between the position of the vehicle 1 and the corresponding roadway 3. As an additional example, the vehicle 1 may be traveling on a "highway" roadway 3, but the navigational data provided by the signal connection 17 may be for a side-road running adjacent to the "highway" roadway 3. In addition, navigational data provided by the signal connection 17 may come from an outdated database or a broken or otherwise impaired satellite 39. For example, in urban environments, due to construction and recent developments, roadways 3 and their associated speed limits are often altered. These limitations of the navigational data may lead to a mismatch between the detected speed limit 21 and the navigational speed limits 19.

Here, in FIG. 2, the navigational speed limit 19 is greater than the detected speed limit 21. In addition, in this non-limiting example, the value of the visual confidence level is greater than the value of the navigational confidence value 30. Accordingly, the detected speed limit 21 has been displayed as the fusion speed limit 33 to the user.

In one or more embodiments, the ECU 5 may further determine a visual weight (not shown) that represents the ECU's 5 measure of certainty that the detected speed limit 21 is still valid. The visual weight has a value from "0-1" (inclusive), where a value of "0" means that the ECU 5 is uncertain of the validity of the speed limit associated with the last detected speed limit sign 23 of the roadway 3, while a value of "1" means that the ECU 5 is highly confident in the validity of the speed limit associated with the last detected speed limit sign 23 of the roadway 3. The value of the visual weight may remain constant or decrease with the distance 27 (e.g., FIG. 6) and/or speed the vehicle 1 travels away from the most recent detected speed limit sign 23.

Once a visual weight (not shown) is established, the visual weight may be multiplied by a visual confidence value 29 (e.g., FIGS. 4A and 4B) to create a visual weighted confidence value (not shown), which may be used by the ECU 5 in place of the visual confidence value 29 during the fusion speed limit 33 generation process. That is, in such a case, the ECU 5 compares the visual weighted confidence value and the navigational confidence value 30 to determine the fusion speed limit 33. As such, the visual weighted confidence value may decrease as the vehicle 1 travels away from the last detected speed limit sign 23. However, the navigational confidence value 30 remains constant until it is updated upon receival of new navigational data from the signal connection 17.

In addition to displaying the fusion speed limit 33 on the dashboard 11, the ECU 5 is configured to generate audible sounds and haptic feedback for the user of the vehicle 1. Specifically, once the ECU 5 determines the fusion speed limit 33, the ECU 5 informs the user, via a sound system (not shown) of the vehicle 1, of the fusion speed limit 33, as well as the identified context of the specific environment. Similarly, the ECU 5 also delivers a signal to one or more components of the steering wheel (not shown) that causes the steering wheel to generate haptic feedback, such as a vibration, to alert the user of the fusion speed limit 33. In the event that the fusion speed limit 33 changes, the ECU 5 also updates the user of the changes with the audio, visual, or haptic feedback.

Figure 3:
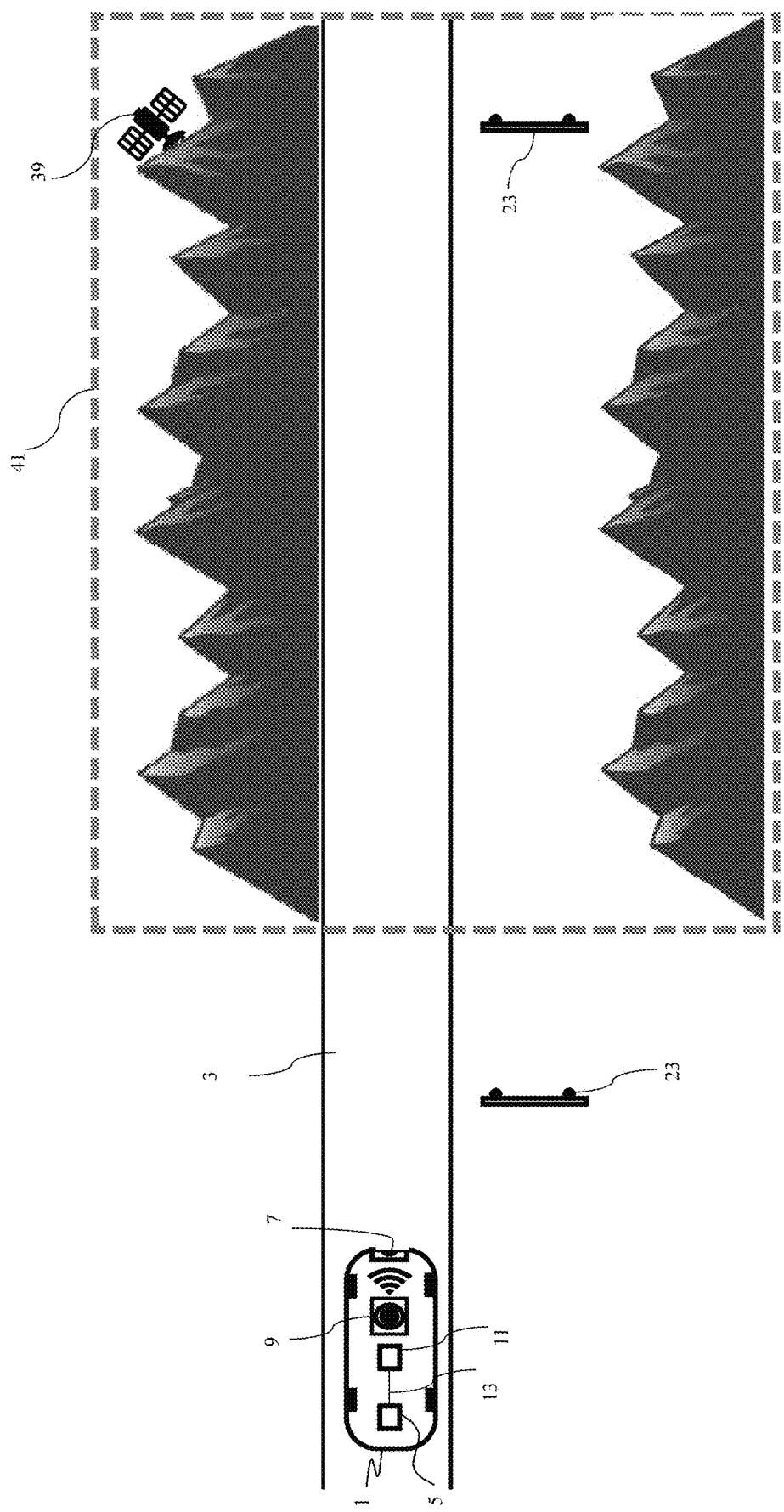
FIG. 3 shows a system in accordance with one or more embodiments disclosed herein.

Turning to FIG. 3, FIG. 3 depicts a scenario where the vehicle 1 transitions from a portion of a roadway 3 where the signal connection 17 is available and connected to the navigational sensor 9 to another portion of the roadway 3 where the signal connection 17 is unavailable. This portion of road where the signal connection 17 is unavailable is referred to herein as a "white zone" 41. While the vehicle 1 is located within a white zone 41, the navigational sensor 9 is unable to connect to the signal connection 17. In the non-limiting example of FIG. 3, the white zone 41 is depicted as a roadway 3 that extends through a mountainous region. However, the white zone 41 may be any portion of a roadway 3 where cellular signal is low or blocked, such as a tunnel, a canyon, or a rural area.

While the vehicle 1 is within a white zone 41, the navigational sensor 9 is not capable of receiving new information from the signal connection 17, such as the GPS coordinates of the vehicle 1, the navigational speed limit 19, and directions to a desired location. Generally, in order to counteract white zones 41, the signal connection 17 may provide a potential forthcoming amount of data for the vehicle 1 to navigate through a white zone 41. One of ordinary skill in the art may appreciate that the navigational data provided by the signal connection 17 to the navigational sensor 9 when the signal connection 17 is available may be delivered in an electronic horizon format, such as Advanced Drivers Assistant System Interface Specifications version 2 (ADASISv2) or Advanced Drivers Assistant System Interface Specifications version 3 (ADASISv3). In this way, it is possible to determine when all the navigational data about the roadway 3 ahead in the electronic horizon has been consumed. For example, while the navigational sensor 9 is in communication with the signal connection 17, the signal connection 17 may provide data with 2 miles of electronic horizon of the roadway 3 ahead.

Still, the amount of electronic horizon data provided to the vehicle 1 may not be enough to counteract a white zone 41. In one instance, the vehicle 1 may consume all of the electronic horizon data prior to reaching the end of the white zone 41 without any new data being retrieved from the signal connection 17 by the navigational sensor 9. For example, the signal connection 17 may have provided 2 miles of electronic horizon data of the roadway 3 ahead prior to the vehicle 1 entering a 5-mile white zone 41. After 2 miles within the white zone 41, the navigational sensor 9 of the vehicle 1 is no longer able to assist the user of the vehicle 1 with the remaining 3 miles of the white zone 41 as additional map data is unavailable.

In another instance, an issue may arise when a vehicle 1 changes direction while in a white zone 41 because the amount of electronic horizon data provided to the navigational sensor 9 may not be sufficient, as the supplied information may be according to a "Most Probable Path" so no new data can be retrieved. Once the vehicle 1 is headed in a different direction than the Most Probable Path, the navigational sensor 9 may be without information of the roadway 3 and unable to assist the user of the vehicle 1.

To mitigate this, the driver assistant system generates and provides the user of the vehicle 1 a fusion speed limit 33. As noted above, when communication between the signal connection 17 and the navigational sensor 9 is available, the ECU 5 compares the detected speed limit 21 to the navigational speed limit 19 in order to generate the fusion speed limit 33. However, in the case the vehicle 1 is traveling in a white zone 41, or the signal connection 17 is otherwise unavailable, the navigational speed limit 19 is unavailable outside of the electronic horizon. In such a case, instead of having one of the fusion speed limit 33 inputs unavailable, resulting in an unavailable determination of the fusion speed limit 33, the ECU 5 compares the detected speed limit 21 to a range of implicit speed limits 43 (e.g., FIG. 4) in order to generate the fusion speed limit 33. The implicit speed limits 43 are a range of overarching maximum and minimum speed limits that are used when the signal connection 17 is unavailable and the navigational data from the electronic horizon has been consumed.

The ECU 5 may store or receive, from the navigational sensor 9, overarching maximum and minimum speed limits that are associated with each context of a specific environment. These overarching maximum and minimum speed limits may be legal speed limits determined by a government entity, or speed limits determined by a user or manufacturer of the system. For example, the ECU 5 may store data that indicates that the maximum speed limit for the "country side" context is 65 Miles Per Hour (MPH), while the minimum speed limit is 40 MPH. Once the ECU 5 has received or determined the overall context of the specific environment, the ECU 5 assigns implicit speed limits 43 to the identified environment as maximum and minimum allowable speed limits. Each context of the specific environment may be associated with different implicit speed limits 43, or one or more contexts may have some or all of the same limits as the other contexts, or overlap therewith.

As such, the implicit speed limits 43 are determined from the navigational data last processed by the navigational sensor 9. This last processed navigational data may be the navigational data received prior to the vehicle 1 entering the white zone 41, or the navigational data consumed in the electronic horizon. Further, this navigational data may include information such as navigational speed limits 19, roadway 3 importance, form of way, construction zone locations, and more. When the signal connection 17 is available, this navigational data is utilized to determine the navigational confidence level (e.g., FIG. 4) of the navigational speed limit 19. However, when the signal connection 17 is unavailable, this navigational data is utilized by the ECU 5 to determine a last known context 45 (e.g., FIG. 4) of the specific environment of the vehicle.

In this way, rather than employing the last received navigational speed limit 19 (usually updated by the electronic horizon when available), the fusion speed limit 33 generation process uses implicit speed limits 43 when all the cloud based map data has been consumed and the signal connection 17 is unavailable. The implicit speed limits 43 are derived by the ECU 5 from information, such as a map or lookup table, stored in a memory (e.g., FIG. 8) of the vehicle 1. Accordingly, the ECU 5 assumes that the last known context 45 identified by the ECU 5 or the navigational sensor 9 from the last received navigational data is still the current context.

Accordingly, the implicit speed limits 43 are compared to the detected speed limit 21 prior to outputting the fusion speed limit 33 to the user of the vehicle 1. If the detected speed limit 21 falls within the implicit speed limits 43, then the maximum overarching speed limit of the implicit speed limits 43, or maximum implicit speed limit 44, is fused with the detected speed limit 21. Specifically, the ECU 5 generates a navigational confidence value 30 associated with the maximum implicit speed limit 44 to be compared to the visual confidence value 29 (e.g., FIG. 4) of the latest detected speed limit 21. Accordingly, if the value of the visual confidence value 29 is greater than the value of the navigational confidence value 30, the ECU 5 displays the detected speed limit 21 as the fusion speed limit 33. However, if the value of the navigational confidence value 30 is greater than the value of the visual confidence value 29, the ECU 5 displays the navigational speed limit 19 as the fusion speed limit 33. Alternatively, if the detected speed limit 21 falls within the implicit speed limits 43, the ECU 5 may display the detected speed limit 21 to the user of the vehicle 1 as the fusion speed limit 33 without fusing the maximum implicit speed limit 44 with the detected speed limit 21.

However, if the detected speed limit 21 determined by the visual sensor 7 is outside of the range of the implicit speed limits 43, the ECU 5 enters a degraded mode 35 and displays an error message or icon indicating that the ECU 5 is unsure of the fusion speed limit 33. Furthermore, the ECU 5 may enter a degraded mode 35 and display an error message or icon to the user subsequent to the vehicle 1 traveling for a predetermined or specified distance or time within a white zone 41 or without communication with the signal connection 17. In addition, the ECU 5 may enter a degraded mode 35 if the vehicle 1 changes directions within in a white zone 41 or without communication with the signal connection 17.

FIG. 4 depicts an example of a fusion matrix 37 that is used as part of a fusion speed limit 33 generation process in accordance with one or more embodiments described herein. In addition, in FIG. 4, the vehicle 1 associated with the example is within a white zone 41. When the signal connection 17 is unavailable, the ECU 5 derives a last known context 45 associated with the last received navigational data prior to entering a white zone 41. Alternatively, if the last navigational data was delivered by the signal connection 17 in an electronic horizon format, the ECU 5 may continue to update the context information as described in FIG. 2 until the navigational data within the electronic horizon is fully consumed. However, if the vehicle 1 changes direction and is no longer traveling along the Most Probable Path while relying on electronic horizon data, the ECU 5 assumes the context to be last known context 45 prior to veering from the Most Probable Path.

The ECU 5 utilizes the last known context 45, derived from the last received navigational data, to designate implicit speed limits 43. In FIG. 4, the ECU 5 of the vehicle 1 stores the last known context 45 and the associated implicit speed limits 43 within the fusion matrix 37. The ECU 5 identified the context of the specific environments of the vehicles 1 as a "city" context, prior to the vehicle 1 entering white zone 41. Unless otherwise specified by map data within an electronic horizon of the vehicle 1, the ECU 5 is configured to assume that the context region remains the same for the vehicle 1 as the vehicle 1 enters and travels through a white zone 41. Accordingly, since the ECU 5 is configured to store overarching speed limits associated with each potential context, the ECU 5 of FIG. 4 designates the implicit speed limits 43 to be the range of 20-45 MPH.

Subsequently, the ECU 5 determines a navigational confidence level for the maximum implicit speed limit 44. Here, the navigational confidence value 30 is a measure of the ECU 5 that the maximum implicit speed limit 44 is an accurate speed limit of the current roadway 3 the vehicle 1 is traveling upon. The navigational confidence value 30 has a value ranging from "0-1" (inclusive), where a value of "0" means that the ECU 5 is uncertain of the accuracy of the maximum implicit speed limit 44, and a value of "1" indicates that the ECU 5 is highly confident in the accuracy of the maximum implicit speed limit 44. In the example of FIG. 4, the navigational confidence level is "0.8" (representing that ECU 5 is highly confident that the maximum implicit speed limit 44 is an accurate speed limit of the current roadway).

In addition, the ECU 5 also includes the detected speed limits 21 of speed limit signs 23 that a vehicle 1 most recently passed while driving within the fusion matrix 37. Each detected speed limit 21 is associated with a visual confidence value 29, where the visual confidence value 29 reflects a confidence level of the ECU 5 that the visual feed of the speed limit sign 23 extracted from the visual sensor 7 of the vehicle 1 is accurate. In FIG. 4, the detected speed limit 21 is 25 MPH and the visual confidence value 29 is "0.3" (representing that ECU 5 is not confident in the data provided by the visual sensor 7).

Figure 5:
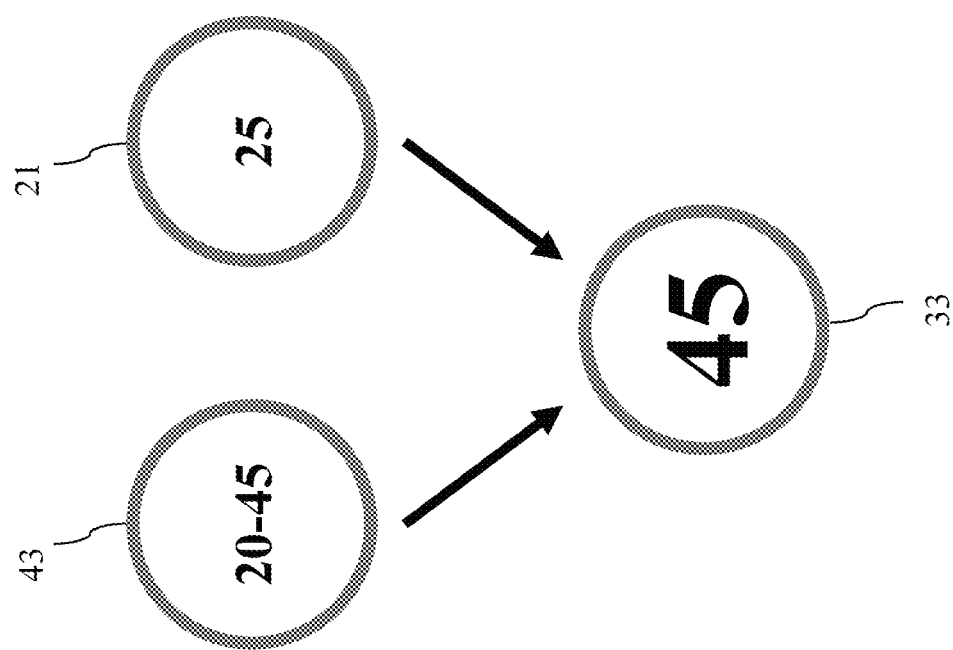
FIG. 5 shows a visualization of a process in accordance with one or more embodiments disclosed herein.

The fusion matrix 37 may also store the fusion speed limit 33. In order to determine the fusion speed limit 33, the ECU 5 compares the detected speed limit 21 to the implicit speed limits 43. The result of this comparison is output by the ECU 5 as a fusion speed limit 33 as shown in FIG. 5, which is displayed to the user of the vehicle 1 via the dashboard 11. Alternatively, if the vehicle 1 is autonomously driven, the ECU 5 uses the fusion speed limit 33 to determine the maximum autonomous operating speed of the vehicle 1 and controls the vehicle 1 to obey the fusion speed limit 33 by operating the braking and acceleration systems (not shown) of the vehicle 1.

FIG. 5 depicts a visualization of a process in accordance with one or more embodiments disclosed herein. Specifically, FIG. 5 depicts an example of the process of the ECU 5 used to generate a fusion speed limit 33 based on the information provided in FIG. 4. The ECU 5 compares the detected speed limit 21 to the implicit speed limits 43. Here, the detected speed limit 21, determined by the most recent speed limit sign 23 detected by the visual sensor 7, falls within the implicit speed limits 43. As a result, the ECU 5 then compares the navigational confidence value 30 (e.g., FIG. 4) to the visual confidence value 29 (e.g., FIG. 4). Alternatively, in one or more embodiments, the detected speed limit 21 may be displayed as the fusion speed limit 33 subsequent to the ECU 5 determining that the detected speed limit 21 falls within the implicit speed limits 43.

In the example of FIG. 4, the navigational confidence value 30 is greater than the visual confidence value 29. One explanation for this occurrence may be due to the weather outside visually impairing the visual sensor 7. The ECU 5 may have determined that the visual sensor 7 captured a speed limit sign 23 indicated "25 MPH," while in reality, the speed limit sign had a value of 45 MPH. Consequently, because the navigational confidence value 30 was greater than the visual confidence value 29, the ECU 5 displays the maximum implicit speed limit 44 on the dashboard 11 as the fusion speed limit 33 to the user.

FIG. 6 depicts another example of a fusion matrix 37 that is used as part of a fusion speed limit 33 generation process in accordance with one or more embodiments described herein. Similarly, in FIG. 6, the vehicle 1 associated with the example is within a white zone 41. The ECU 5 uses the last known context 45, derived from the last received navigational data, to designate implicit speed limits 43. Here, the ECU 5 identified the context of the specific environments of the vehicles 1 as a "country side" context, prior to the navigational sensor 9 consuming all of the map data of the electronic horizon while within a white zone 41. Accordingly, because the ECU 5 stores overarching speed limits associated with each potential context, the ECU 5 of FIG. 6 designates the implicit speed limits 43 to be the range of 40-65 MPH.

The ECU 5 then determines a navigational confidence value 30 for the maximum implicit speed limit 44. In the example of FIG. 6, the navigational confidence value 30 is "0.5" (representing that ECU 5 is fairly confident that the maximum implicit speed limit 44 is an accurate speed limit of the current roadway 3).

In the non-limiting example of FIG. 6, the ECU 5 further stores a distance 27 the vehicle 1 has travelled since consuming all of the map data available within the electronic horizon in the fusion matrix 37. Alternatively, the distance 27 may be calculated as the distance 27 the vehicle 1 has travelled since the signal connection 17 became unavailable or the distance 27 the vehicle 1 has travelled since entering a white zone 41. In addition, the fusion matrix 37 includes a navigational weight 25 associated with the maximum implicit speed limit 44. The navigational weight 25 is similar to the visual weight (not shown) in that the navigational weight 25 represents the ECU's 5 measure of certainty that the implicit speed limits 43 are still valid. The navigational weight 25 is a value ranging from "0-1" (inclusive), where a value of "0" means that the ECU 5 is uncertain of the validity of the speed limit associated with the last known context 45, while a value of "1" means that the ECU 5 is highly confident in the validity of the speed limit associated with the last known context 45. The value of the navigational weight 25 is closest to "1" at a time that the signal connection 17 or map data within electronic horizon just becomes unavailable, but the value of the navigational weight 25 decreases with the distance 27 the vehicle 1 travels without receiving new navigational data from the signal connection 17. Specifically, as the distance 27 the vehicle 1 travels without receiving new navigational data from the signal connection 17 increases, the likelihood that the context assumed from the last received navigational data is still associated with the current detected speed limit 21 decreases.

To account for this, the ECU 5 may be configured to decrease the value of the navigational weight 25 at a predetermined rate. The predetermined rate may be determined, for example, based upon the current speed of the vehicle 1, where a high vehicle 1 speed corresponds to a fast rate of decay of the navigational weight 25, while a slow vehicle 1 speed is associated with a relatively slow rate of decrease of the navigational weight 25. Alternatively, the ECU 5 may enter a degraded mode 35 if the vehicle 1 travels for a predetermined or specified distance or time without communication with the signal connection 17. Furthermore, the algorithm used to calculate the decrease of the value of the navigational weight 25 may be of a linear, polynomic, sinusoidal, or equivalent form without departing from the nature of the specification.

The ECU 5 multiplies the navigational weight 25 associated with the implicit speed limits 43 with the navigational confidence value 30 to create a navigational weighted confidence value 31. In FIG. 6, which is associated with a maximum implicit speed limit 44 of 65 MPH, the ECU 5 multiplies the navigational weight 25 of "0.5" (representing that the speed limit of 65 MPH is fairly likely to still be valid after 3 miles) and the navigational confidence value 30 of "0.5" associated with this maximum implicit speed limit 44 for a navigational weighted confidence value 31 of "0.25".

In one or more embodiments, the fusion matrix 37 may also include a visual weight (not shown) associated with the detected speed limit 21. The visual weight represents the ECU's 5 measure of certainty that the detected speed limit 21 is still valid. Further, the visual weight has a value from "0-1" (inclusive), where a value of "0" means that the ECU 5 is uncertain of the validity of the speed limit associated with the last detected speed limit sign 23 of the roadway 3, while a value of "1" means that the ECU 5 is highly confident in the validity of the speed limit associated with the last detected speed limit sign 23 of the roadway 3. The value of the visual weight may remain constant or decrease with the distance 27 and/or speed the vehicle 1 travels away from the most recent detected speed limit sign 23. The predetermined rate of decays of the values of the navigational weight 25 associated with the implicit speed limits 43 and the visual weight associated with the detected speed limit 21 may be applied at all times, regardless of whether the vehicle 1 is located within a white zone 41 or not.

Figure 7:
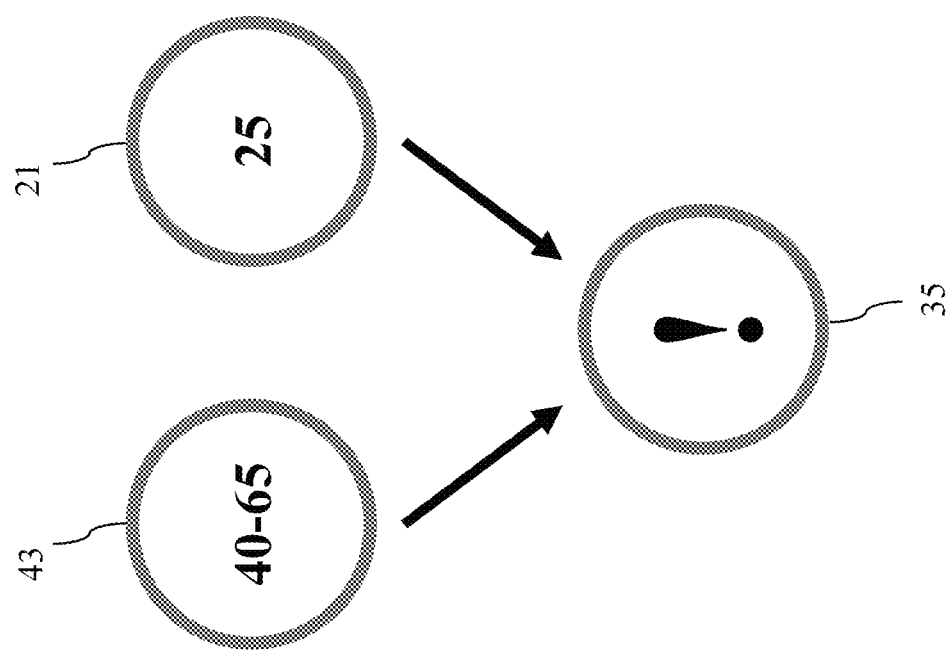
FIG. 7 shows a visualization of a process in accordance with one or more embodiments disclosed herein.

FIG. 7 shows a visualization of a process in accordance with one or more embodiments disclosed herein. Specifically, FIG. 7 depicts an example of the process of the ECU 5 used to generate a fusion speed limit 33 based on the information provided in FIG. 6. The ECU 5 of the vehicle 1 assumed that the vehicle 1 was traveling in a "country side" context based on the last received navigational data. Accordingly, in this example, the implicit speed limits 43 were designated as the overarching speed limits of 40-65 MPH. However, the most recent detected speed limit 21 was detected as 25 MPH. In this case, because detected speed limit 21 is outside of the range of the implicit speed limits 43, the ECU 5 enters a degraded mode 35 and displays an error icon on the dashboard 11 to indicate that the ECU 5 is unsure of the fusion speed limit 33. Accordingly, the ECU 5 has recognized that the last received navigational data and the last known context 45 no longer apply to the current roadway 3.

The latest detected speed limit 21 may not fall within the implicit speed limits 43 for several reasons. One particular reason may be that the vehicle 1 has left the context region associated with the last received navigational data and entered a different context while still within a white zone 41. Similarly, if the vehicle 1 were traveling on a "highway" roadway 3 prior to entering a white zone 41 and the user decided to take an exit while still within the white zone 41, the visual sensor 7 would detect the slower speed limit sign 23 located along the exit ramp of the highway, thereby likely causing the latest detected speed limit 21 to be less than the minimum implicit speed limit 43.

In contrast, the visual sensor 7 may detect a speed limit sign 23 associated with an exit ramp of a "highway" roadway 3 while the vehicle 1 is still located on the "highway" roadway 3. In such a case, the ECU 5 validates whether the vehicle 1 takes the exit ramp prior to updating the detected speed limit 21 within a fusion matrix 37. If the ECU 5 determines that the vehicle 1 took the exit ramp, the detected speed limit sign 23 associated with the exit ramp is employed as the detected speed limit 21. However, if the ECU 5 determines that the vehicle 1 continued along the "highway" roadway 3, passing the exit ramp, the detected speed limit sign 23 of the exit ramp is filtered by the ECU 5 and the last detected speed limit sign 23 associated with the "highway" roadway 5 is still employed as the detected speed limit 21.

Further, the detected speed limit 21 may not fall within the implicit speed limits 43 in the case that the vehicle 1 encounters construction along the roadway 3 while within a white zone 41, as construction zones along roadways 3 typically require vehicles 1 to reduce speed in order to prevent accidents. In addition, the weather of the environment outside the vehicle 1 may hinder the visual sensor 7 to accurately capture the value disposed upon the speed limit sign 23. One of ordinary skill in the art will appreciate that there are numerous reasons why speed limits of speed limit signs 23 may increase or decrease while a vehicle 1 travels through a white zone 41.

Figure 8:
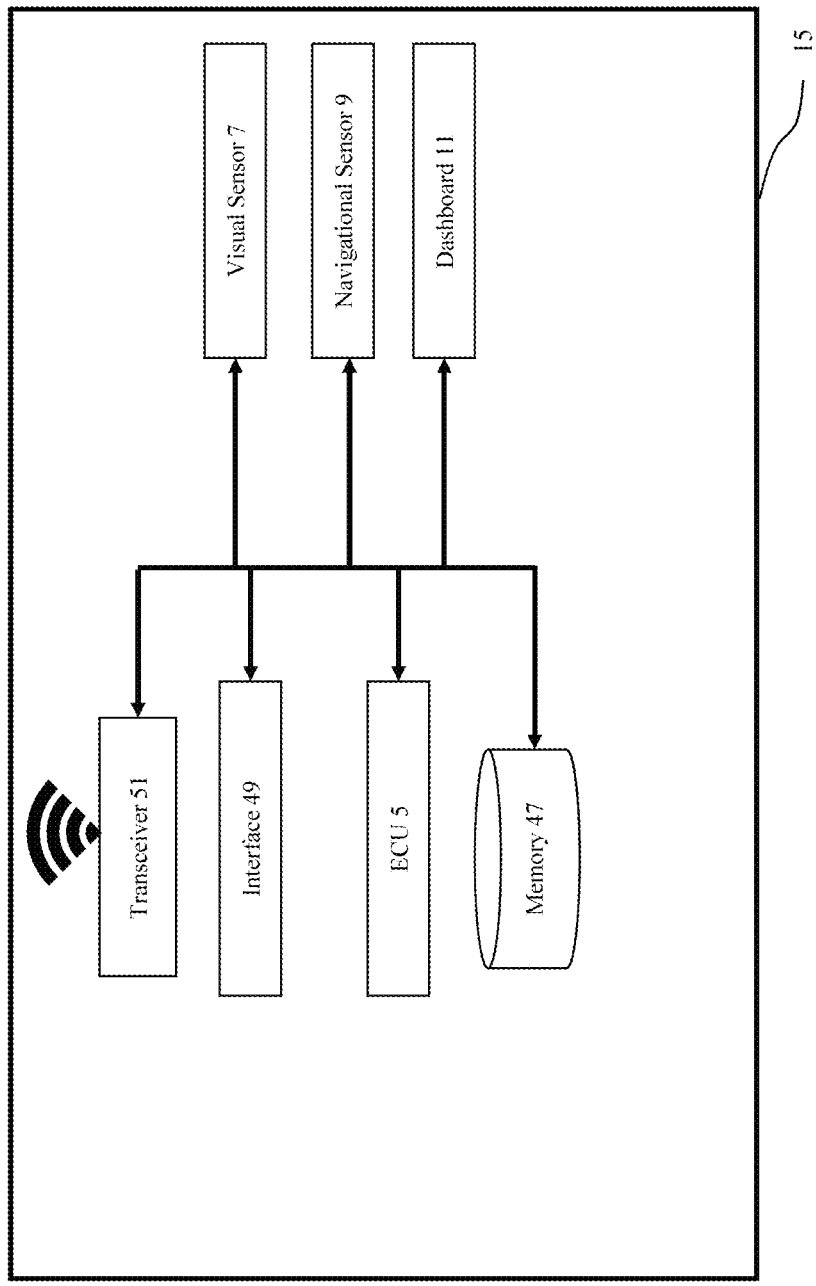
FIG. 8 shows a system in accordance with one or more embodiments disclosed herein.

FIG. 8 depicts a system overview of an Advanced Driver Assistance System (ADAS) 15 in accordance with one or more embodiments of the invention. The vehicle 1 includes a visual sensor 7 which may be an optical sensor such as a camera, radar unit, LiDAR unit, ultrasonic sensor, or other equivalent sensors known to a person of ordinary skill in the art. Additionally, the vehicle 1 includes a navigational sensor 9 which may be a GPS sensor. The navigational sensor 9 is configured to receive coordinates indicating the position of the vehicle 1 and, in one or more embodiments, the navigational speed limit 19 at the location of the coordinates, which is used to determine the fusion speed limit 33 as described above. The location of the vehicle 1 may be determined by the navigational sensor 9 using satellite based triangulation or trilateration, for example, and the navigational sensor 9 may be connected to a database, server, stored memory, or network to receive the navigational speed limits 19, as is commonly known in the art. Alternatively, the navigational speed limit 19 may be received from an external database or server, for example, or derived from information stored in the vehicle 1 itself.

As described above, the visual sensor 7 transmits captured data of the environment of the vehicle 1 to the ECU 5, which is a processor, microprocessor, or circuit that performs processing of the various data described herein. Data is transmitted to the ECU 5 by way of a bus 13, which is wires, wiring harnesses, circuit boards, or equivalent means to interconnect the various components of the vehicle 1. The ECU 5 processes the data using algorithms and processes to extract context information such as the location of the vehicle 1, context signs, obstacles, warning information, guidance information, and regulatory information from the captured data.

After capturing the data, the visual sensor 7 transmits the captured data to a memory 47. The memory 47 is a non-transitory storage medium such as flash memory, Random Access Memory (RAM), a Hard Disk Drive (HDD), a solid state drive (SSD), a combination thereof, or equivalent. In addition to storing the captured data, the memory 47 also stores processes and/or algorithms that facilitate analyzing captured data, the fusion matrix 37 and its associated values, information of the vehicle 1, processes for sending and receiving information to a user (via a dashboard 11, for example), and other functions and processes described herein. Furthermore, the memory 47 stores the fusion matrix 37 as well as its constituent values, the video feed, the GPS coordinates, and other forms of data described herein.

The ADAS 15 further includes an interface 49 and a dashboard 11 in order to transmit information to a user of the vehicle 1. The dashboard 11 may be a Liquid Crystal Display (LCD), Organic Light-Emitting Diode (OLED), or equivalent display, while the interface 49 may be one or more buttons, dials, or a touchscreen that allows a user to interact with the vehicle 1. The dashboard 11 displays information such as a context determination and a fusion speed limit 33 to a user, which allows the user to see an accurate speed limit of a roadway 3 at any period of time while driving. On the other hand, the interface 49 allows a user to select convenience features such as a unit for measuring the speed limit (such as MPH or Kilometers Per Hour (KPH)). The interface 49 may also be used to adjust the context determination process itself, such as allowing a user to manually reset the context determination by pressing a button or icon, or allowing the user to manually set the context of the vehicle 1 to a desired context region, for example.

In order to provide further usability and ease of access to a user of the driver assistant system, the ADAS 15 includes a transceiver 51, which wirelessly transmits and receives signals to and from the vehicle 1. Example embodiments of the transceiver 51 include an antenna (not shown) and processor (not shown) that transmit and receive radar, radio, cellular, satellite 39, Wi-Fi, Bluetooth, Wi-Max, or other equivalent signals. The transceiver 51 may be used to receive navigational data prior to the vehicle 1 entering a white zone 41. Further, the transceiver 51 may transmit data about the white zone 41 itself to a server or other nearby vehicles 1. This data may include data captured by the visual sensor 7, electronic horizon data, navigational sensor 9 data, and the context determination data.

Figure 9:
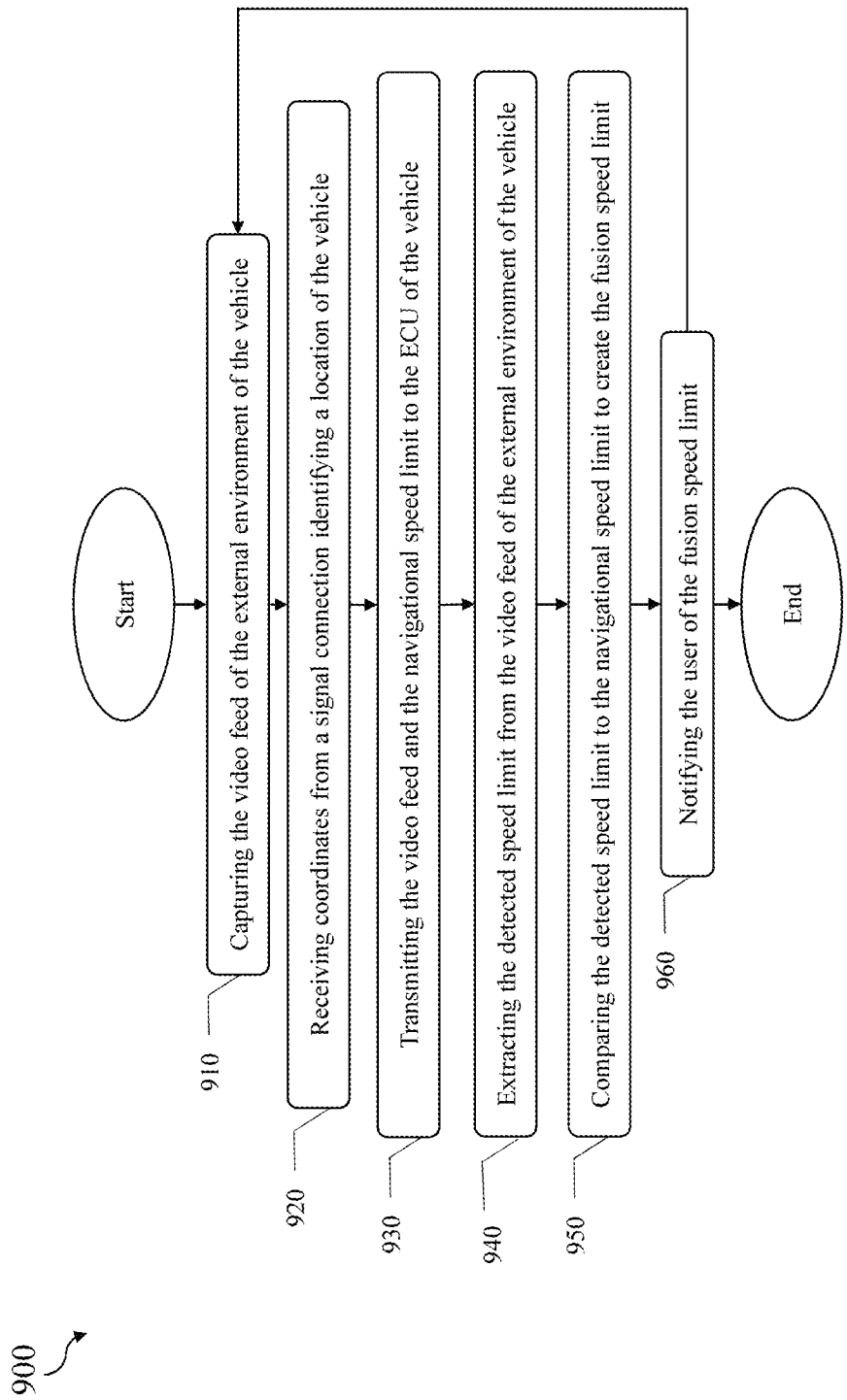
FIG. 9 shows a flowchart of a method in accordance with one or more embodiments disclosed herein.

FIG. 9 depicts a flowchart 900 of a method for determining a fusion speed limit 33 when the signal connection 17 is available in accordance with one or more embodiments disclosed herein. Steps of the flowchart shown in FIG. 9 may be performed by an ADAS 15 as described herein, but are not limited thereto. The constituent steps of the method depicted in FIG. 9 may be performed in any logical order, and the method is not limited to the sequence presented.

As depicted in FIG. 9, the method initiates at step 910, which includes capturing a video feed of an external environment of a vehicle 1. The video feed may be captured while the vehicle 1 is stationary or mobile, and is captured with a visual sensor 7 of the vehicle 1. The video feed is a forward facing view of a roadway 3, parking lot, paved surface, dirt road, or other view in front of a vehicle 1, and includes obstacles, signs, and other landmarks in the vicinity of the vehicle 1.

In step 920, the vehicle 1 receives GPS coordinates and a navigational speed limit 19 at the location identified by the GPS coordinates from a signal connection 17. In particular, an ADAS 15 of a vehicle 1 includes a navigational sensor 9, which connects to a satellite 39 network to receive the GPS coordinates. The position of the vehicle 1 may be derived through a triangulation or trilateration procedure, while the navigational speed limits 19 may be received from an external source (such as a server) or a stored database, such as a data annotated map.

In one or more embodiments, the ECU 5 or the navigational sensor 9 may determine the context of the specific environment of the vehicle 1 based on the context information provided within the navigational data supplied to the vehicle 1 by the signal connection 17. This context information may include navigational speed limits 19, roadway 3 importance, form of way, construction zone locations, and more. Alternatively, the ECU 5 or the navigational sensor 9 may be provided the context of the specific environment of the vehicle 1 by the navigational data supplied to the vehicle 1 by the signal connection 17.

In step 930, the ECU 5 receives data including the video feed, the coordinates, and the navigational speed limits 19 from the visual sensor 7 and the navigational sensor 9. As discussed above, the ECU 5 is connected to the visual sensor 7 and the navigational sensor 9 via a bus 13. Thus, step 930 includes transmitting the data from the visual sensor 7 and the navigational sensor 9 via the bus 13 to the ECU 5.

In step 940, the video feed is analyzed by the ECU 5 to extract speed limit signs 23 and the associated speed limit displayed upon each speed limit sign 23 from the environment of the vehicle 1. In this step, images of the video feed are processed through an object detection algorithm to determine the detected speed limit 21. Nonlimiting examples of object detection algorithms include convolutional neural networks such as Region-Based Convolutional Neural Networks (R-CNN), Fast R-CNN, and Single Shot Detectors (SSD) such as YOLO (You Only Look Once). The object detection process may be performed by the ECU 5, a dedicated component such as a graphics card, or by the visual sensor 7 itself. Other object detection algorithms may be used in conjunction with a captured video feed without departing from the nature of this specification. Once the detected speed limits 21 are extracted from the video feed, the method proceeds to step 950. Further, each detected speed limit 21 is also associated with a visual confidence value 29 that corresponds as a decimal ranging from "0-1" that indicates the confidence that the ECU 5 has in the accuracy of the detected speed limit 21. In one or more embodiments, each detected speed limit 21 may also be associated with a visual weight (not shown) that also corresponds as a decimal ranging from "0-1." The visual weight indicates the confidence that the ECU 5 has in the validity of the detected speed limit 21.

In step 950, the ECU 5 compares the detected speed limit 21 to the navigational speed limit 19 to create a fusion speed limit 33. Specifically, the ECU 5 compares the visual confidence value 29 associated with the detected speed limit 21 to the navigational confidence value 30 associated with the navigational speed limit 21. In a case where the value of the visual confidence value 29 is greater than the value of the navigational confidence value 30, the ECU 5 displays the detected speed limit 21 as the fusion speed limit 33. However, if the value of the navigational confidence value 30 is greater than the value of the visual confidence value 29, the ECU 5 displays the navigational speed limit 19 as the fusion speed limit 33. The fusion speed limit 33 generation process is repeated for each update to the navigational speed limit 19 and the detected speed limit 21 provided by the navigational sensor 9 and visual sensor 7, respectively.

The ECU 5 may enter a degraded mode 35 and display an error message or icon indicating that the ECU 5 is unsure of the fusion speed limit 33 if both of the visual confidence value 29 and the navigational confidence value 30 are below a predetermined value. Also, the ECU 5 may alternatively enter the degraded mode 35 if the detected speed limit 21 is greater than or less than the navigational speed limit 19 by a predetermined amount. This process ensures that the user is alerted that a speed limit may be too fast or too slow for the surrounding environment.

In step 960, the fusion speed limit 33 is output to a user via a dashboard 11. The dashboard 11 is located in a cabin of the vehicle 1, and presents visual information related to the operation of the vehicle 1 to the user. Thus, the fusion speed limit 33 is displayed to a user in the cabin of the vehicle 1 alongside the operating information. The fusion speed limit 33 may be output as an icon that is identical to a speed limit sign 23, or alternatively output as a number with text indicating that the number is the fusion speed limit 33. The fusion speed limit 33 may further include an icon that designates that the fusion speed limit 33 is identical to the detected speed limit 21 or the navigational speed limit 19. In addition, an icon may be displayed across the dashboard 11 to indicate that the ECU 5 has entered the degraded mode 35. In addition to displaying the fusion speed limit 33 on the dashboard 11, the ECU 5 is configured to generate audible sounds and haptic feedback for the user of the vehicle 1.

Thus, the method completes with the user being apprised of the fusion speed limit 33. Alternatively, in a case where the vehicle 1 is an autonomous vehicle 1, the method may include an additional step of controlling the vehicle 1 (with the ECU 5, for example) to obey the fusion speed limit 33. Following step 960, the method may restart at step 910 to employ the latest speed limit sign 23 detected by the visual sensor 7, as well as the latest navigational data received by the navigational sensor 9 from the signal connection 17.

Figure 10:
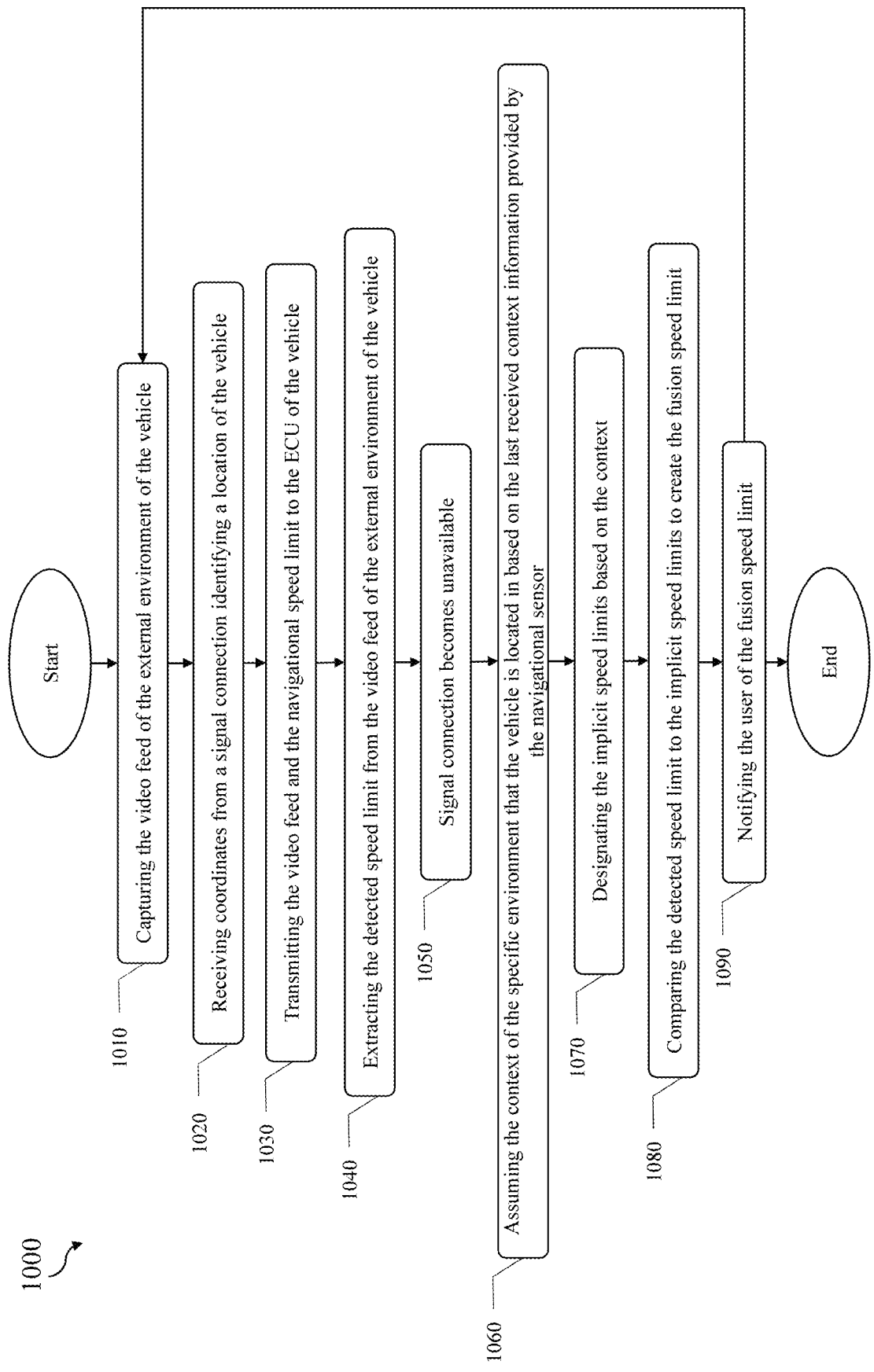
FIG. 10 shows a flowchart of a method in accordance with one or more embodiments disclosed herein.

FIG. 10 depicts a flowchart 1000 of a method for determining a fusion speed limit 33 when the signal connection 17 is unavailable and/or the navigational sensor 9 has consumed all available navigational data provided within an electronic horizon in accordance with one or more embodiments disclosed herein. Steps of the flowchart shown in FIG. 10 may be performed by an ADAS 15 as described herein, but are not limited thereto. The constituent steps of the method depicted in FIG. 10 may be performed in any logical order, and the method is not limited to the sequence presented.

In step 1010, a video feed of an environment of the vehicle 1 is captured. The vehicle 1 is equipped with a visual sensor 7 that may be embodied, for example, as a two dimensional camera, a three dimensional camera, or a series of cameras. The visual sensor 7 captures a video feed that includes speed limit signs 23 located in the vicinity of the vehicle 1, which allows the video feed to be analyzed to determine detected speed limit 21. The video feed is transmitted to a memory 47 for further processing, and the ECU 5 is able to access the video feed by interfacing with the memory 47.

In step 1020, the vehicle 1 receives GPS coordinates identifying the location of the vehicle 1. The GPS coordinates are received using a navigational sensor 9, for example. Based upon the GPS coordinates, the vehicle 1 receives a navigational speed limit 19 for its current location. The navigational speed limit 19, which is a form of regulatory information, may be received from an external server (not shown) or derived from information, such as a map or lookup table, stored in a memory 47 of the vehicle 1. If the navigational speed limit 19 is retrieved from an external source, such as a server, the regulatory information is received via a transceiver 51.

In step 1030, the video feed, the GPS coordinates, and the navigational speed limit 19 are transmitted to an ECU 5 of the vehicle 1. Structurally, the visual sensor 7 and the navigational sensor 9 are connected to the ECU 5 via a bus 13, which is a series of wires or similar data transmission means. The ECU 5 may send signals requesting the video feed, GPS coordinates, and navigational speed limits 19 to the visual sensor 7 and the navigational sensor 9. Alternatively, the visual sensor 7 and the navigational sensor 9 may transmit the data at routine intervals according to the speed of the vehicle 1, a predetermined transmission rate, or at a request of a user without departing from the nature of this specification.

In step 1040, the video feed is analyzed by the ECU 5 to extract speed limit signs 23 and the associated speed limit displayed upon each speed limit sign 23 from the environment of the vehicle 1. In this step, the images of the video feed are processed through an object detection algorithm to determine the detected speed limit 21. Nonlimiting examples of object detection algorithms include convolutional neural networks such as Region-Based Convolutional Neural Networks (R-CNN), Fast R-CNN, and Single Shot Detectors (SSD) such as YOLO (You Only Look Once). The object detection process may be performed by the ECU 5, a dedicated component such as a graphics card, or by the visual sensor 7 itself. Other object detection algorithms may be used in conjunction with a captured video feed without departing from the nature of this specification. Once the detected speed limits 21 are extracted from the video feed, the method proceeds to step 1050. Further, each detected speed limit 21 is also associated with a visual confidence value 29 that corresponds as a decimal ranging from "0-1" that indicates the confidence that the ECU 5 has in the accuracy of the detected speed limit 21. In one or more embodiments, each detected speed limit 21 may be associated with a visual weight that also corresponds as a decimal ranging from "0-1" that indicates the confidence that the ECU 5 has in the validity of the detected speed limit 21.

In step 1050, the signal connection 17 is no longer available to connect with the navigational sensor 9 of the vehicle 1. Consequently, while the signal connection 17 is unavailable, the navigational sensor 9 is not capable of receiving new information from the signal connection 17, such as the GPS coordinates of the vehicle 1, navigational speed limits 19, and directions to a desired location. The signal connection 17 may be unavailable along any portion of a roadway 3 where cellular signal is low or blocked, such as a tunnel, a canyon, or a rural area. In one or more embodiments, in step 1050, the navigational sensor 9 of the vehicle 1 has consumed all the navigational data provided within an electronic horizon of the vehicle 1.

In step 1060, the ECU 5 assumes the context of the specific environment of the vehicle 1 based on the last received navigational data provided to the navigational sensor 9 by the signal connection 17 prior to the signal connection 17 becoming unavailable. As such, subsequent to the signal connection 17 becoming unavailable, the ECU 5 may assume the context to be the last known context 45, identified prior to the navigational sensor 9 no longer receiving navigational data. The last received navigational data provided to the navigational sensor 9 by the signal connection 17 prior to the signal connection 17 becoming unavailable may be delivered in electronic horizon format. In such instances, the ECU 5 may extract several miles or kilometers of navigational data and context information according to a Most Probable Path of the vehicle 1.

In step 1070, the ECU 5 designates implicit speed limits 43 associated with the assumed context of the specific environment based upon the last received navigational data (i.e., in a scenario in which current navigational data is lost). Specifically, the implicit speed limits 43 are a range of overarching speed limits associated with the assumed context. The overarching speed limits may be legal speed limits determined by a government entity for a context, or speed limits determined by a user or manufacturer of the system. As such, implicit speed limits 43 for each context may be stored in the memory 47.

In step 1080, the detected speed limit 21 determined in step 1040 is compared to the implicit speed limits 43 designated in step 1060 within a fusion matrix 37. During the comparison process, the ECU 5 determines whether the detected speed limit 21 falls within the range of the implicit speed limits 43 associated with the assumed context. If the ECU 5 determines that the detected speed limit 21 is outside of the implicit speed limits 43, the ECU 5 enters into a degraded mode 35 in step 1090. This aids in preventing the vehicle 1 from moving at a speed too fast or slow for conditions, as the user is alerted that the detected speed limit 21 is faster or slower than a speed limit typical for the assumed context of the specific environment. Such a situation may occur, for example, in a construction zone within a "highway" context, where the detected speed limit 21 of the construction zone is lower than the minimum safe speed limit of "highway" roadways 3. Because the ECU 5 enters the degraded mode 35, the user of the vehicle 1 will be aware that the detected speed limit 21 extracted from the video feed is slower than a typical operating speed for the context region. The degraded mode 35 may be indicated and enacted, for example, by displaying an icon such as an exclamation point on the dashboard 11 to the user, which occurs in step 1090.

However, if the detected speed limit 21 is determined to be within the implicit speed limits 43, the ECU 5 compares the visual confidence value 29 associated with the detected speed limit 21 to the navigational confidence value 30 associated with a maximum implicit speed limit 44. If the value of the visual confidence value 29 is greater than the value of the navigational confidence value 30, the ECU 5 displays the detected speed limit 21 as the fusion speed limit 33. If the value of the navigational confidence value 30 is greater than the value of the visual confidence value 29, the ECU 5 displays the navigational speed limit 19 as the fusion speed limit 33. However, the ECU 5 may enter a degraded mode 35 and display an error message or icon indicating that the ECU 5 is unsure of the fusion speed limit 33 if both of the visual confidence value 29 and the navigational confidence value 30 are below a predetermined value. In addition, the ECU 5 may enter a degraded mode 35 subsequent to the vehicle 1 traveling without new navigational data or connection to the signal connection 17 for a specified distance or length of time.

Alternatively, if the detected speed limit 21 is determined to be within the implicit speed limits 43, the ECU 5 may output a fusion speed limit 33 that matches the detected speed limit 21 in step 1090. In this case, the detected speed limit 21 is validated through the comparison process such that the ECU 5 is aware that the detected speed limit 21 is not too fast or slow for the assumed context.

In one or more embodiments, the ECU 5 may determine and assign a navigational weight 25 to the implicit speed limits 43 that represents the ECU's 5 measure of certainty that the implicit speed limits 43 are still valid. As such, the navigational weight 25 is multiplied by the navigational confidence value 30 to form a navigational weighted confidence value 31. In the case that the detected speed limit 21 falls within the implicit speed limits 43, the ECU 5 may compare the visual confidence value 29 to the navigational weighted confidence value 31 within the fusion matrix 37 instead of the navigational confidence value 30 in order to determine a fusion speed limit 33.

In one or more embodiments, a visual weight (not shown) may be multiplied by the visual confidence value 29 in order to form a visual weighted confidence value (not shown). Accordingly, if the detected speed limit 21 falls within the implicit speed limits 43, the ECU 5 may compare the navigational confidence value 30 to the visual weighted confidence value within the fusion matrix 37 instead of the visual confidence value 29 in order to determine a fusion speed limit 33. Alternatively, in one or more embodiments, if the detected speed limit 21 falls within the implicit speed limits 43, the ECU 5 may compare the visual weighted confidence value to the navigational weighted confidence value 31 within the fusion matrix 37 in order to determine a fusion speed limit 33.

In step 1090, the fusion speed limit 33 is output to a user via a dashboard 11. Accordingly, the fusion speed limit 33 is displayed to a user in the cabin of the vehicle 1 alongside the operating information. The fusion speed limit 33 may be output as an icon that is identical to a speed limit sign 23, or alternatively output as a number with text indicating that the number is the fusion speed limit 33. The fusion speed limit 33 may further include an icon that designates that the detected speed limit 21 is within the range of the implicit speed limits 43, or an icon to indicate that the ECU 5 has entered the degraded mode 35. In addition to displaying the fusion speed limit 33 on the dashboard 11, the ECU 5 is configured to generate audible sounds and haptic feedback for the user of the vehicle 1.

The method completes with the user being apprised of the fusion speed limit 33. Alternatively, in a case where the vehicle 1 is an autonomous vehicle 1, the method may include an additional step of controlling the vehicle 1 (with the ECU 5, for example) to obey the fusion speed limit 33.

Following step 1090, the method may restart at step 1010 if the signal connection 17 is still unavailable to compare the latest detected speed limit 21 detected by the visual sensor 7 to the latest implicit speed limits 43. However, if the signal connection 17 becomes available, the method may restart at step 910 of FIG. 9 to compare the latest detected speed limit 21 detected by the visual sensor 7 to the latest navigational speed limit 19 received by the navigational sensor 9 from the signal connection 17.

Accordingly, embodiments disclosed herein relate to systems and methods useful for determining a fusion speed limit 33 based upon the surrounding environment of a vehicle 1. Specifically, when a signal connection 17 is available, embodiments disclosed herein may utilize navigational data updated in real-time to determine the context of the specific environment that a vehicle 1 is located within, and when the signal connection 17 is unavailable, embodiments disclosed herein may utilize the last received navigational data to assume the context region of the vehicle 1. Based upon a detected speed limit 21, the availability of the signal connection 17, and the context determination process, an ECU 5 outputs a fusion speed limit 33. In contrast to solely detecting a speed limit by a visual sensor 7 or receiving a navigational speed limit 19 through a navigational sensor 9, a vehicle 1 equipped with an Advanced Driver Assistance System (ADAS) 15 as described herein is capable of filtering out false or otherwise invalid speed limits. This advantageously increases the safety of the user by ensuring that the vehicle 1 only ever displays speed limits that are within acceptable limits for the current environment.

Although only a few example embodiments have been described in detail above, those skilled in the art will readily appreciate that many modifications are possible in the example embodiments without materially departing from this invention. For example, the ECU 5 may receive a context determination from an external or internal server or database. In this case, the ECU 5 compares the detected speed limit 21 to a speed limit associated with the received determination information without the need for a fusion matrix 37 or confidence values 29, which increases the efficiency of the system. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke AIA 35 U.S.C. § 112(f) for any limitations of any of the claims herein, except for those in which the claim expressly uses the words 'means for' together with an associated function.

What is claimed is:

1. A method for operating a driver assistance system for a vehicle, comprising:
   capturing a video feed of an external environment of the vehicle;
   receiving coordinates and a navigational speed limit from a signal connection identifying a location of the vehicle;
   transmitting the video feed and the coordinates to an Electronic Control Unit (ECU) of the vehicle;
   extracting a detected speed limit from the video feed of the external environment of the vehicle;
   comparing the detected speed limit to the navigational speed limit to create a fusion speed limit;
   notifying a user of the vehicle of the fusion speed limit; and
   determining a specific environment that the vehicle is located in based on at least one of the coordinates or the navigational speed limit provided by a navigational sensor and implicit speed limits based on the specific environment, the implicit speed limits being determined at a time when the signal connection is unavailable after receiving the navigational speed limit.

2. The method of claim 1, wherein each location that is designated as the specific environment is associated with a range of overarching speed limits of the vehicle.

3. The method of claim 1, further comprising comparing the detected speed limit to the implicit speed limits to create the fusion speed limit at the time when the signal connection is unavailable.

4. The method of claim 3, further comprising notifying the user when the detected speed limit is outside a range of overarching speed limits, where the range of overarching speed limits is derived from the implicit speed limits.

5. The method of claim 1, further comprising notifying the user when the vehicle has travelled a set distance without the signal connection.

6. The method of claim 1, further comprising assigning a navigational confidence value to the navigational speed limit representing a level of confidence that the navigational speed limit is accurate.

7. The method of claim 1, further comprising assigning a visual confidence value to the detected speed limit representing a level of confidence that the detected speed limit extracted from the video feed is accurate.

8. The method of claim 1, further comprises automatically controlling a speed of the vehicle according to the fusion speed limit.

9. A driver assistance system for a vehicle, comprising:
- a visual sensor configured to capture a video feed of an external environment of the vehicle;
- a navigational sensor configured to receive coordinates and a navigational speed limit from a signal connection identifying a location of the vehicle;
- a dashboard configured to notify a user of the vehicle of one or more vehicle operating conditions; and
- an Electronic Control Unit (ECU) configured to:
  - receive the video feed from the visual sensor;
  - receive the coordinates and navigational speed limit from the navigational sensor;
  - extract a detected speed limit from the video feed of the external environment of the vehicle;
  - compare the detected speed limit to the navigational speed limit to create a fusion speed limit;
  - output the fusion speed limit to the dashboard to notify the user of the fusion speed limit; and
  - determine a specific environment that the vehicle is located in based on at least one of the coordinates or the navigational speed limit provided by the navigational sensor and implicit speed limits based on the specific environment, the implicit speed limits being determined at a time when the signal connection is unavailable after receiving the navigational speed limit.

10. The driver assistance system of claim 9, wherein each location that is designated as the specific environment is associated with an overarching range of speed limits of the vehicle.

11. The driver assistance system of claim 9, wherein, at the time when the signal connection is unavailable, the ECU is configured to compare the detected speed limit to the implicit speed limits to create the fusion speed limit.

12. The driver assistance system of claim 11, wherein the ECU is configured to output an alert to the dashboard to notify the user when the detected speed limit is outside a range of overarching speed limits, where the range of overarching speed limits is derived from the implicit speed limits.

13. The driver assistance system of claim 9, wherein the ECU is configured to output an alert to the dashboard to notify the user when the vehicle has travelled a set distance without the signal connection.

14. The driver assistance system of claim 9, wherein the ECU is configured to assign a navigational confidence value to the navigational speed limit representing a level of confidence that the navigational speed limit received by the navigational sensor is accurate.

15. The driver assistance system of claim 9, wherein the ECU is configured to assign a visual confidence value to the detected speed limit representing a level of confidence that the detected speed limit extracted from video feed of the visual sensor is accurate.

16. The driver assistance system of claim 9, wherein the ECU is configured to automatically control a speed of the vehicle according to the fusion speed limit.

* * * * *